United States Patent
Watanabe

[11] Patent Number: 6,088,709
[45] Date of Patent: Jul. 11, 2000

[54] DOCUMENT PROCESSING UNIT FOR ENABLING COLLECTIVE SEEING OF COMMENTS ADDED SEPARATELY BY DIFFERENT PERSONS TO DOCUMENT COPIES CONTAINING THE SAME TEXT PART

[75] Inventor: Tutomu Watanabe, Kanagawa, Japan

[73] Assignee: Fuji Xerox Co., Ltd., Tokyo, Japan

[21] Appl. No.: 08/530,510

[22] Filed: Sep. 19, 1995

[30] Foreign Application Priority Data

Sep. 20, 1994 [JP] Japan .................................. 6-250192

[51] Int. Cl.$^7$ ........................................................ G06T 3/00
[52] U.S. Cl. ........................................................... 707/512
[58] Field of Search .................................... 395/773–782, 395/799, 326, 339–346; 345/326, 339–346; 707/512–521, 526–531

[56] References Cited

U.S. PATENT DOCUMENTS

| | | | |
|---|---|---|---|
| 5,146,552 | 9/1992 | Cassorla et al. ........................ | 395/773 |
| 5,367,623 | 11/1994 | Iwai et al. ............................... | 345/350 |
| 5,398,310 | 3/1995 | Tchao et al. ............................ | 395/773 |

FOREIGN PATENT DOCUMENTS

| | | |
|---|---|---|
| 4-336672 | 11/1992 | Japan . |
| 5-40594 | 2/1993 | Japan . |
| 5-282254 | 10/1993 | Japan . |

*Primary Examiner*—Almis R. Jankus
*Attorney, Agent, or Firm*—Finnegan, Henderson, Farabow, Garrett & Dunner, L.L.P.

[57] ABSTRACT

Copies of a document having the same text part among documents stored in a document storage unit are read out from the document storage unit and a separation unit separates the comment parts from the text part. Resultantly, one text part and a plurality of comment parts are provided. A layout unit again lays out the comment parts thus separated for the same text part.

4 Claims, 13 Drawing Sheets

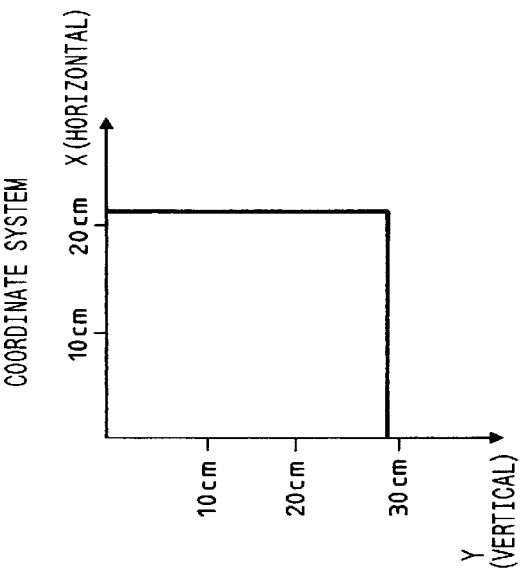
FIG. 8(a) DOCUMENT A with COMMENT 1, COMMENT 2, COMMENT 3
FIG. 8(b) DOCUMENT B with COMMENT 1, COMMENT 2, COMMENT 3
FIG. 8(c) COORDINATE SYSTEM, X (HORIZONTAL), Y (VERTICAL)
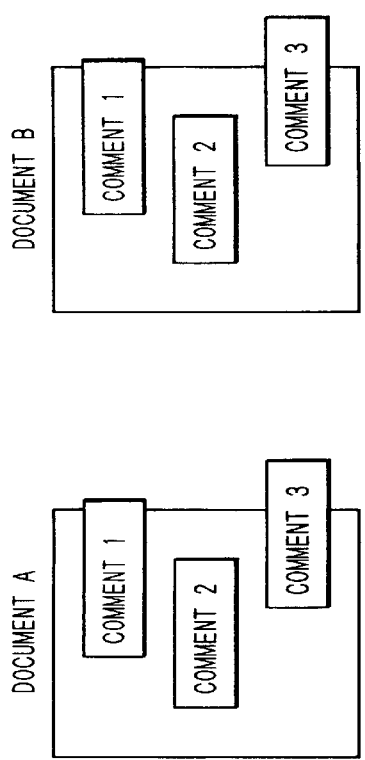
FIG. 8(d) COMMENT DATA OF DOCUMENT A (TABLE 1)
| COMMENT ID | X COORDINATE | Y COORDINATE | HEIGHT | WIDTH | CONTENTS |
|---|---|---|---|---|---|
| 1 | 10 | 2 | 2 | 8 | .... |
| 2 | 5 | 11 | 2 | 8 | .... |
| 3 | 18 | 15 | 2 | 8 | .... |
FIG. 8(e) COMMENT DATA OF DOCUMENT B (TABLE 2)
| COMMENT ID | X COORDINATE | Y COORDINATE | HEIGHT | WIDTH | CONTENTS |
|---|---|---|---|---|---|
| 1 | 10 | 2 | 2 | 8 | .... |
| 2 | 6 | 11 | 2 | 8 | .... |
| 3 | 18 | 16 | 2 | 8 | .... |

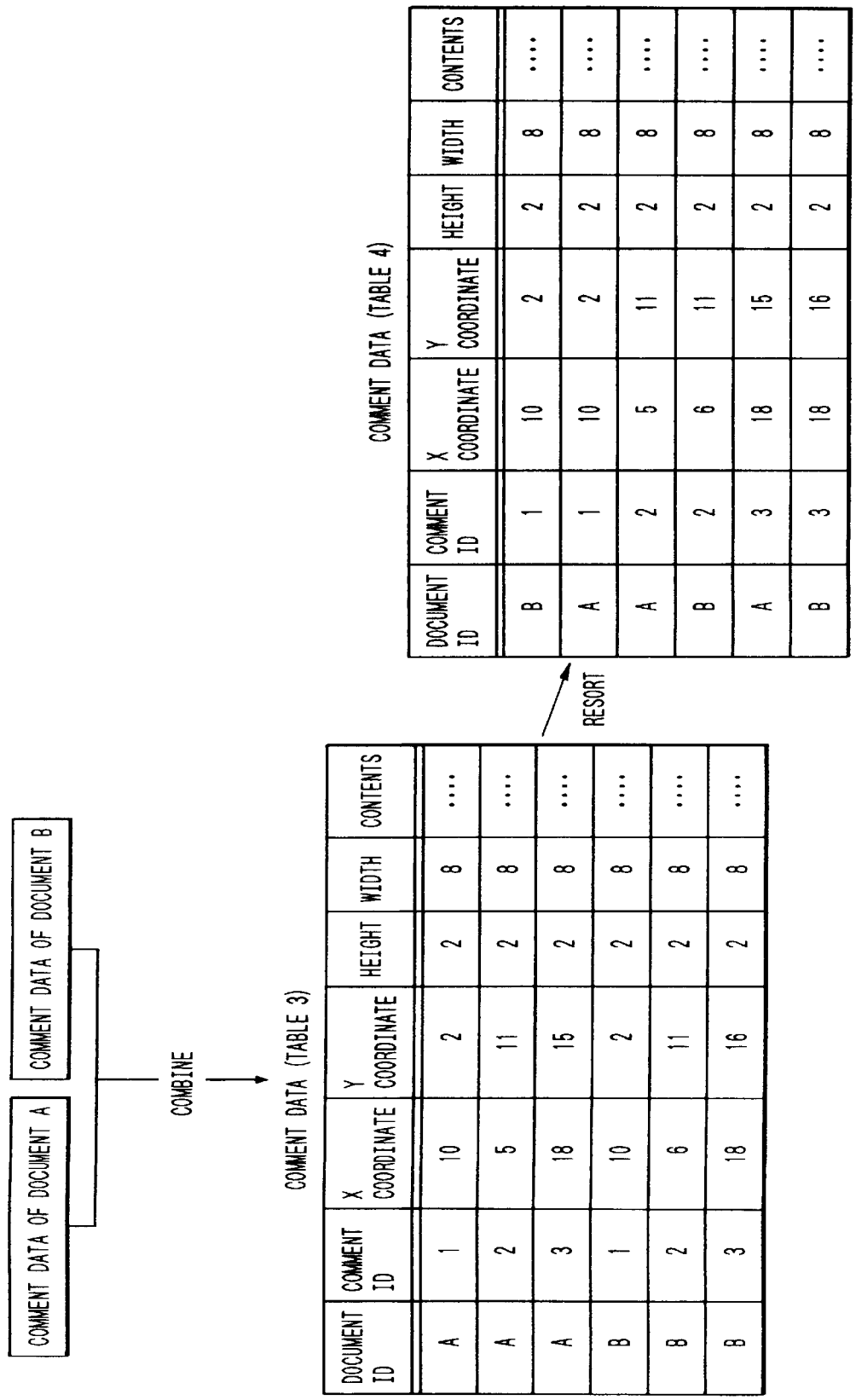

FIG. 11

COMMENT DATA (TABLE 4) → AGAIN LAID OUT

COMMENT DATA (TABLE 5)

| DOCUMENT ID | COMMENT ID | X COORDINATE | Y COORDINATE | HEIGHT | WIDTH | CONTENTS | CORRECTION X COORDINATE | CORRECTION Y COORDINATE |
|---|---|---|---|---|---|---|---|---|
| A | 1 | 10 | 2 | 2 | 8 | ... | 22 | 1 |
| B | 1 | 10 | 2 | 2 | 8 | ... | 22 | 3 |
| A | 2 | 5 | 11 | 2 | 8 | ... | 22 | 10 |
| B | 2 | 6 | 11 | 2 | 8 | ... | 22 | 12 |
| A | 3 | 18 | 15 | 2 | 8 | ... | 22 | 14.5 |
| B | 3 | 18 | 16 | 2 | 8 | ... | 22 | 16.5 |

FIG. 12(a)
LAYOUT TABLE 1
| # | Y COORDINATE | WIDTH | CORRECTION Y | CORRECTION WIDTH |
|---|---|---|---|---|
| 1 | 10 | 4 | 10 | 4 |
| 2 | 10 | 4 | 10 | 4 |
| 3 | 15 | 4 | 15 | 4 |
| 4 | 17 | 4 | 17 | 4 |
FIG. 12(b)
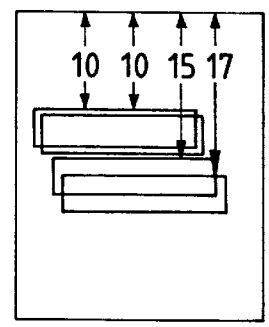
FIG. 12(c)
LAYOUT TABLE 2
| # | Y COORDINATE | WIDTH | CORRECTION Y | CORRECTION WIDTH |
|---|---|---|---|---|
| 1 | 10 | 4 | 8 | 8 |
| 2 | 10 | 4 | 12 | 0 |
| 3 | 15 | 4 | 15 | 4 |
| 4 | 17 | 4 | 17 | 4 |
FIG. 12(d)
LAYOUT TABLE 3
| # | Y COORDINATE | WIDTH | CORRECTION Y | CORRECTION WIDTH |
|---|---|---|---|---|
| 1 | 10 | 4 | 7.666 | 12 |
| 2 | 10 | 4 | 11.666 | 0 |
| 3 | 15 | 4 | 15.666 | 0 |
| 4 | 17 | 4 | 17 | 4 |
FIG. 12(e)
LAYOUT TABLE 4
| # | Y COORDINATE | WIDTH | CORRECTION Y | CORRECTION WIDTH |
|---|---|---|---|---|
| 1 | 10 | 4 | 7 | 16 |
| 2 | 10 | 4 | 11 | 0 |
| 3 | 15 | 4 | 15 | 0 |
| 4 | 17 | 4 | 19 | 0 |
FIG. 12(f)
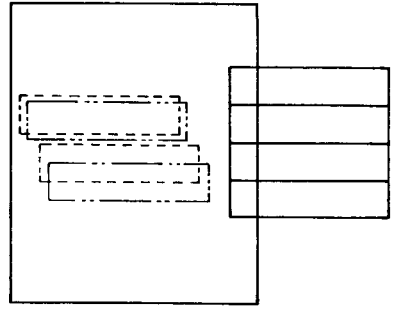

DOCUMENT PROCESSING UNIT FOR ENABLING COLLECTIVE SEEING OF COMMENTS ADDED SEPARATELY BY DIFFERENT PERSONS TO DOCUMENT COPIES CONTAINING THE SAME TEXT PART

BACKGROUND OF THE INVENTION

The present invention relates to a document processing unit for managing documents to which comments can be added and in particular to a document processing unit for enabling collective seeing of comments added separately by different persons to document copies containing the same text part.

A conventional portable information processing unit is provided with a tag function for adding tag information to a desired position on a proper page in an electronic document file operated in the unit for efficient retrieval according to the tag information, for example, as described in Japanese Patent Unexamined Publication Nos. Hei 5-40594 and 5-282254.

An electronic filing system in related art gives a tag pattern to retrieved information for temporary storage to facilitate later retrieval from the temporary storage, as described in Japanese Patent Unexamined Publication No.Hei 4-336672.

Usually, in business places and offices, more than one document copy containing the same text part is made and distributed to the persons concerned for requesting them to add any comments, then the document copies to which comments are added are collected and a report is prepared or some decision is made with reference to the comments. It is convenient to collect and see the comments on the same page or place of the document. However, to do so, the comments need to be sorted out from the document copies; the job imposes a heavy burden on the operator.

Prior art for lightening the burden imposed on the operator is not found. The tag information adding techniques provided by the conventional portable information processing unit and electronic filing system are not intended for any application handling document copies which are the same in text part and differ only in tag information; they are not useful for application in which more than one document copy containing the same text part is made and distributed to the persons concerned for requesting them to add any comments, then the document copies to which comments are added are collected and sorted out for collective seeing of the comments.

SUMMARY OF THE INVENTION

It is an object of the present invention to provide a document processing unit for enabling collective seeing of comments added separately by different persons to document copies containing the same text part.

To the end, according to the invention, there is provided a document processing unit comprising document storage means for storing a plurality of documents each consisting of a text part containing text and a comment part in which a comment on the text is written, separation means for separating the comment part from the text part for each copy of a document having the same text part among the documents stored in the document storage means, and layout means for again laying out one or more comment part separated by the separation means for the same text part.

Each of the documents handled in the invention consists of a text part containing text and a comment part in which a comment on the text is written by the person concerned. To prepare the document, for example, copies, of the document containing only the text part are distributed to the persons concerned, who then write comments on tags, etc., added to the document copies. The document copies thus prepared are collected and stored in the document storage means. Therefore, there can be document copies having the same text part to which comment parts are added; the comment parts on the same text part of the document are displayed at the same time, whereby various comments on the same text part, written by the persons concerned, can be totally understood. For this purpose, in the invention, first, copies of a document having the same text part among the documents stored in the document storage means are read out from the document storage means and the separation means separates the comment parts from the text part. Resultantly, one text part and a plurality of comment parts are provided. The layout means again lays out the comment parts thus separated for the same text part. Thus, in the invention, the comment parts added separately by the persons concerned to the same text part are automatically again laid out, thereby enabling them to be viewed at a glance.

BRIEF DESCRIPTION OF THE DRAWINGS

FIG. 3(*b*) is an illustration schematically showing how to again lay out comment parts in the invention;

FIGS. 8(*a*) to 8(*e*) are illustrations for explaining an example of document copies A and B to which a relayout process is applied and data in their comment parts; FIG. 9 is an illustration showing a process of preparing composite comment data (Table 3);

FIG. 11 is an illustration showing an example of comment data containing coordinates corrected by the relayout process;

FIGS. 12(*a*) to 12(*f*) are illustrations showing transition of data change as the relayout process is executed.

DETAILED DESCRIPTION OF THE INVENTION

Figure 1:
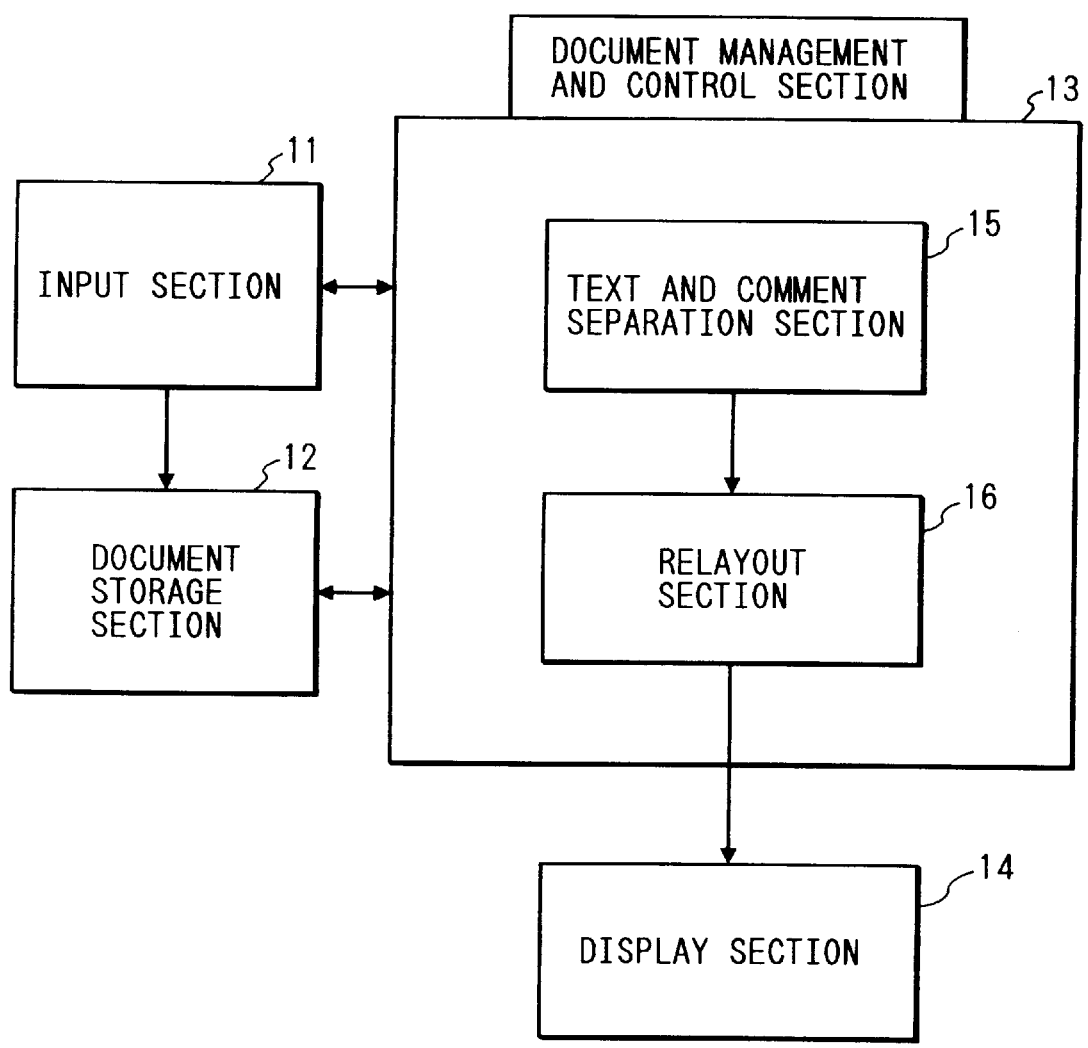
FIG. 1 is a block diagram showing the configuration of a document processing unit according to an embodiment of the invention.
Figure 2:
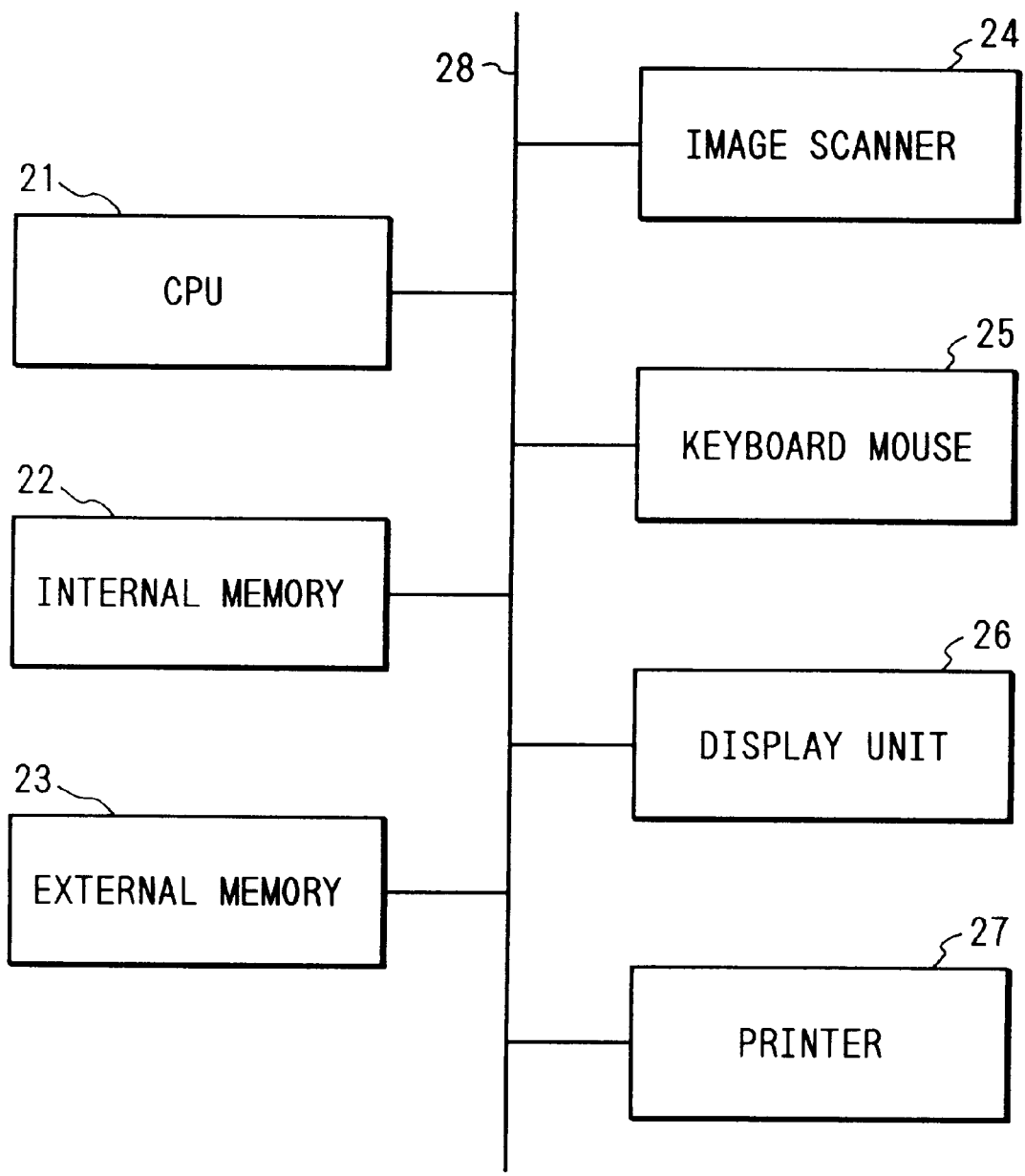
FIG. 2 is a block diagram showing a configuration example of hardware for providing the processing function of the document processing unit according to the embodiment in FIG. 1.

FIG. 1 is a functional block diagram showing the configuration of a document processing unit according to an embodiment of the invention. The document processing unit comprises an input section 11 for the user to enter instructions, commands, and document data, a document storage section 12 for storing documents each containing a text part and a comment part if a comment on the text is made, a document management and control section 13 for managing the documents stored in the document storage section 12, and a display section 14 for displaying the documents. The document management and control section 13 comprises a text and comment separation section 15 for separating the document in the document storage section 12 specified through the input section 11 into the text part and comment part and a relayout section 16 for again laying out the comment parts together with the text part for easy seeing in addition to general document management functions such as storage, read, and retrieval. FIG. 2 is a block diagram showing the hardware configuration for providing the functions of the document processing unit. In the figure, components 21–27 are connected to each other by a bus 28. An image scanner 24 for inputting documents as image data and a keyboard and mouse 25 for entering command information and data are connected to the bus 28 as the input section 11. A display unit 26 such as a CRT display is connected to the bus 28 as the display section 14 and a printer 27 for printing out is connected to the bus 28. Further, a CPU 21 and an internal memory 22 are connected to the bus 28; programs and data required for the functions of the text and comment separation section 15 and the relayout section 16 are loaded into the internal memory 22 and executed by the CPU 21, whereby the functions of the document processing unit are provided. An external memory 23 is used as the document storage section 12 in which documents are stored.

Figure 3A:
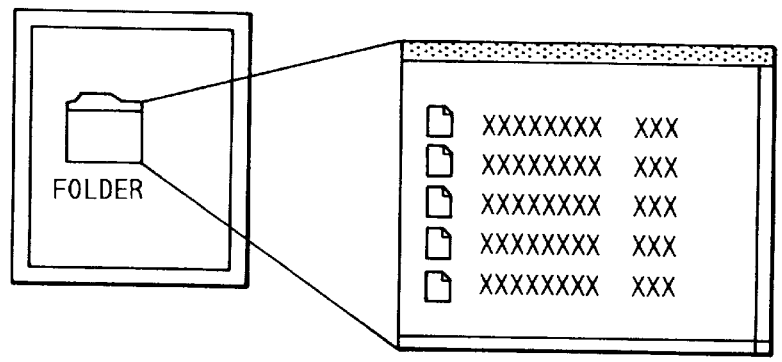
FIG. 3(*a*) is an illustration for explaining an user interface used when a document is specified.
Figure 3B:
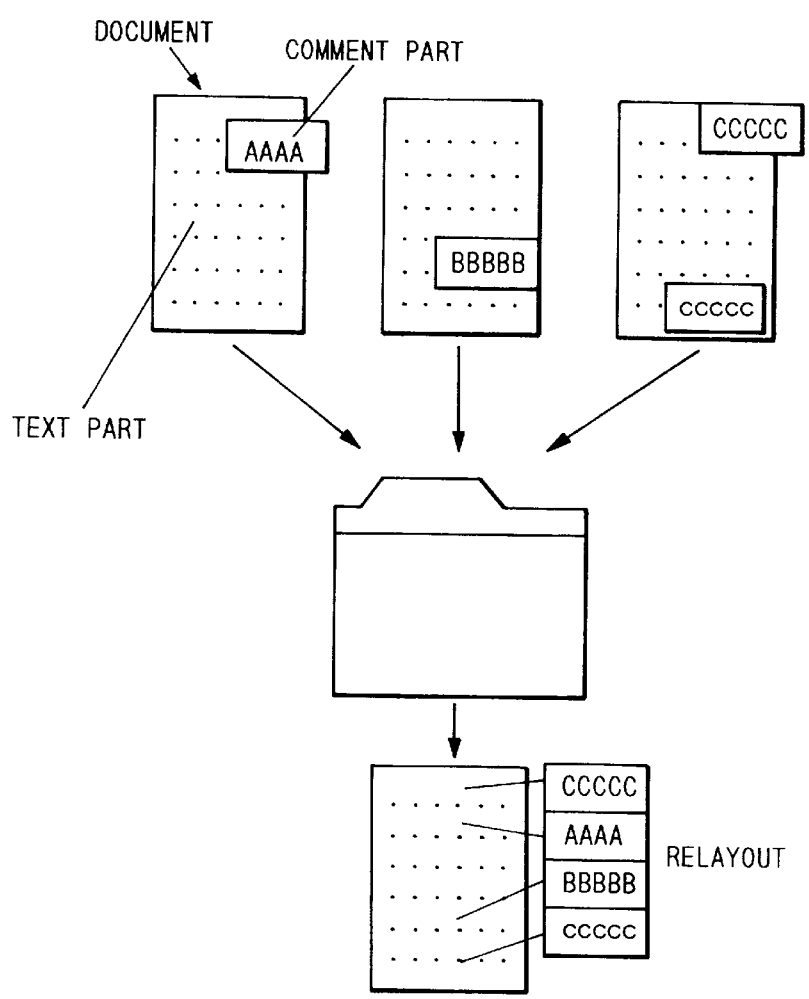
Figure 4:
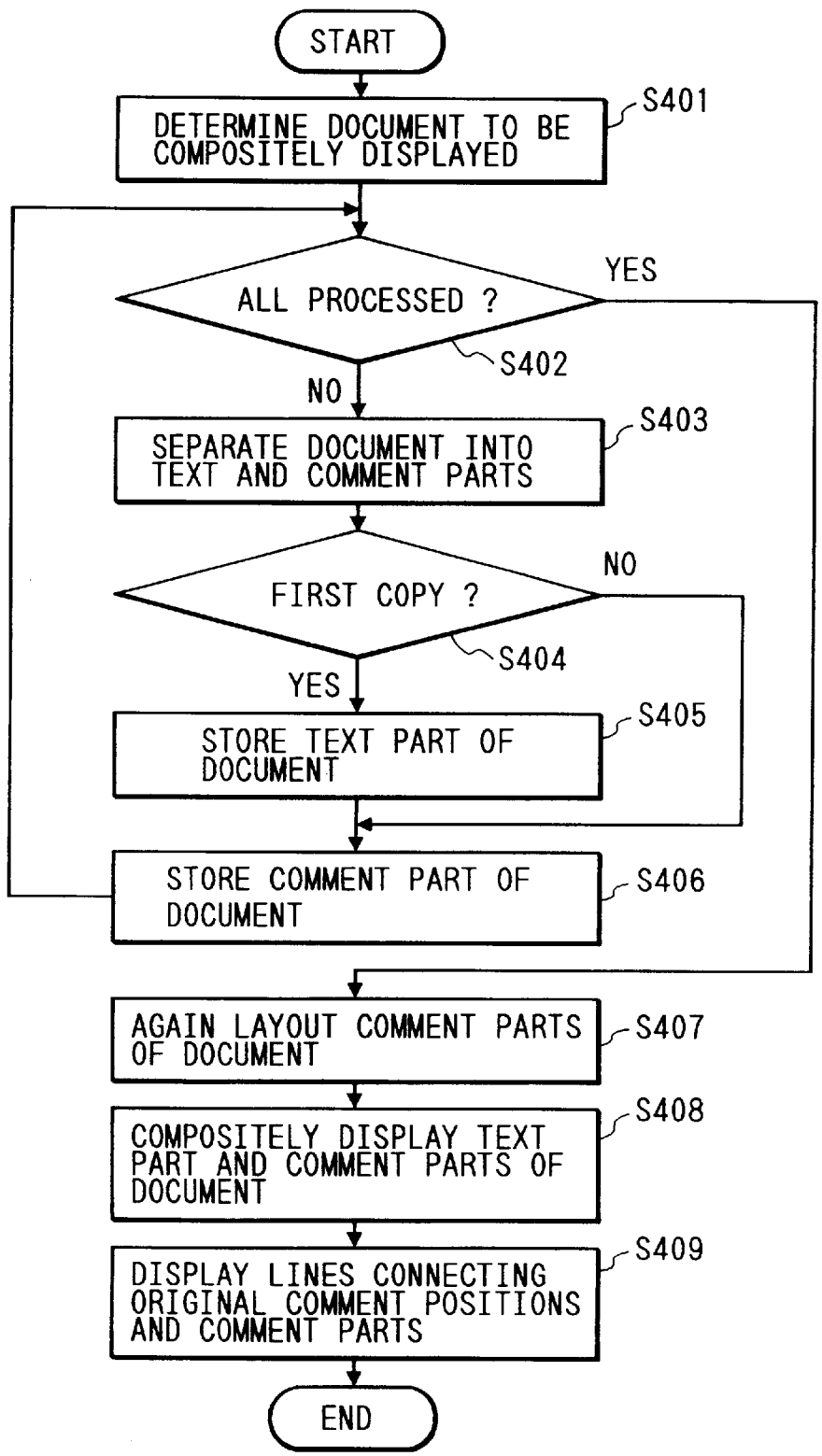
FIG. 4 is a flowchart showing the operation of the embodiment.

The operation of the document processing unit according to the embodiment will be discussed with reference to FIGS. 3(*a*), 3(*b*) and 4.

For simplicity, the embodiment assumes that the object document consists of one left-bound sheet of paper as horizontal writing. A number of copies of the document are made and distributed to the persons concerned for requesting them to add any comments. The persons concerned to whom the object document is distributed add any comments on the document to any desired positions of the object document in a proper form. For example, they write a comment onto a label and paste the label to a desired position or write a comment directly in the text part.

The object document copies having the text part to which the comment parts are thus added are collected and input to the input section 11 of the document processing unit and stored in the document storage section 12 under the control of the document management and control section 13. After this, the comment parts on the same document together with the text part are compositely displayed so that they can be viewed at a glance. FIG. 3(*b*) shows schematically how three document copies having the same text part to which comment parts are added are stored in a folder of the document storage section 12 and the comment parts of the three document copies are compositely displayed.

To compositely display the comment parts added to the same document together with the text part so that they can be viewed at a glance, the user specifies the document to be compositely displayed through the input section 11. The embodiment assumes that document management is executed via a user interface using the display screen of the display section 14. The document management and control section 13 shows the user the documents to which comment parts are added, stored in the document storage section 12 as a folder. As shown in FIG. 3(*a*), when the user opens the folder, stored documents each having different comment parts are listed. When the user points to a desired document on the document list with a pointing device such as a mouse for specifying the document, the document management and control section 13 determines the document to be compositely displayed in response to the specification at step S401. Next, the text and comment separation section 15 reads the copies of the specified document to which different comment parts are added, one at a time and separates the text part and the comment part from each other at steps S402–S406. That is, one copy of the specified document is separated into the text part and the comment part at step S403. For the document to which comment discrimination information is added when a comment is added, the text and comment parts are separated according to the information. For example, if a given box indicating a comment field is provided and it is predetermined that a comment is written in the box, the comment part can be extracted based on the box. If such comment part discrimination information is not added, a document consisting only of a text part before comments are added is prespecified and the difference between the document and a specified document (copy) is found for discriminating a comment part from the text part.

When the text and comment parts are separated, whether or not the document is the first copy is determined at step S404. When it is the first copy, the text part of the document is stored in a temporary storage section such as the internal memory at step S405, then the extracted comment part is stored in the internal memory. When the document is not the first copy, the text part is already stored and only the extracted comment part is stored at step S406.

When the separation process is executed for the specified document and all copies of the specified document have been processed (when YES at step S402), the relayout section 16 again lays out the text part and the comment parts at step S407.

Figure 5:
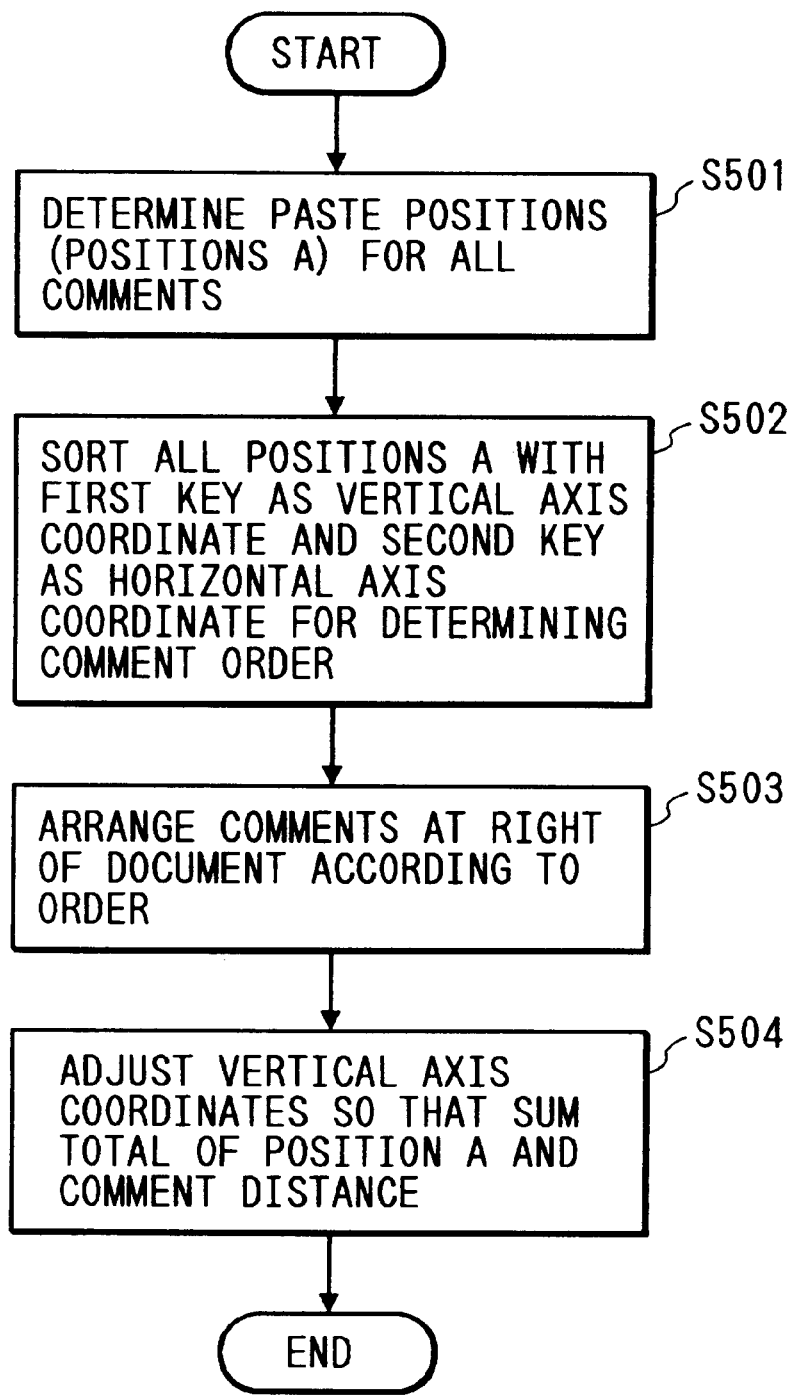
FIG. 5 is a flowchart outlining a relayout process.

FIG. 5 is a flowchart outlining the relayout process. First, the position in which each comment is placed (Position A) is determined for all comments at step S501. For example, if the comment has a rectangular area, its position is found as coordinates of the upper left corner of the area. All Positions A are sorted with the first key as the vertical axis (Y axis) coordinate and the second key as the horizontal axis (X axis) coordinate, thereby determining the comment placement order at step S502. The comments are arranged at the right positions of the document according to the order at step S503. The vertical axis coordinates are adjusted so that the sum total of Position A and comment part distance is lessened at step S504.

The relayout process will be described later in detail using a specific example.

Upon determination of a layout by the relayout section 16, the display section 14 compositely displays the text part and the comment parts according to the layout at step S408.

Last, lines connecting the original positions of the comment parts and the positions after replacement of the comment parts are displayed at step S409.

Figure 6:
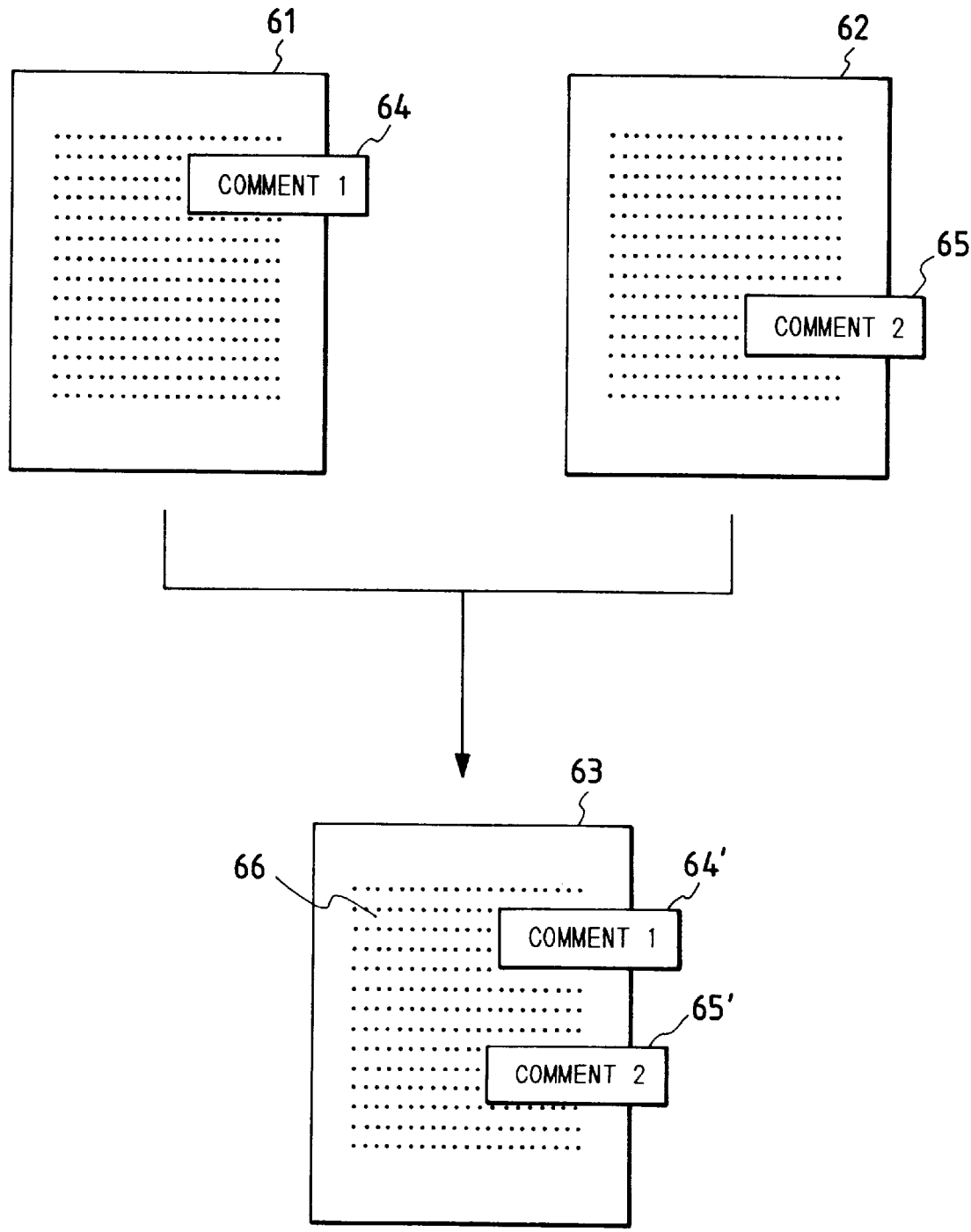
FIG. 6 is an illustration for explaining an example of relayout.
Figure 7:
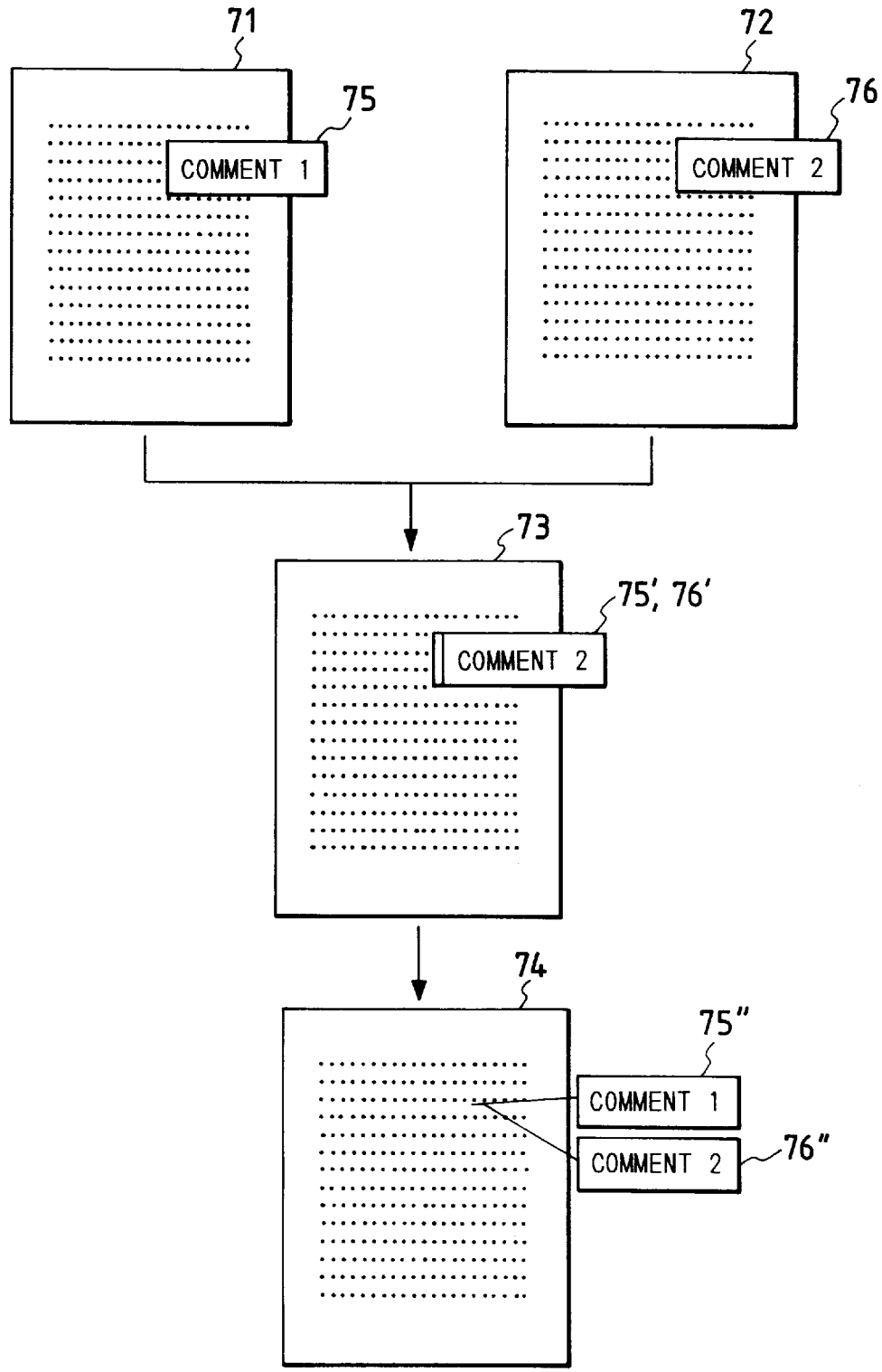
FIG. 7 is an illustration for explaining another example of relayout.

FIGS. 6 and 7 are illustration for explaining relayout examples.

FIG. 6 shows an example in which two document copies 61 and 62 having comment parts added to positions not overlapping each other are compositely displayed for providing a document 63. In this example, comment parts 64 and 65 do not overlap and comment parts 64' and 65' in the document 63 after composite display may be placed in the original positions. In the illustrated example, a text part 66 overlaps the comment parts 64' and 65'; if they are placed in accordance with a placement criterion such that comment parts are placed in positions not overlapping the text part, all of the text and comment parts can be viewed.

In the example in FIG. 7, comment parts 75 and 76 of two document copies 71 and 72 overlap and if they are compositely displayed as they are at the original positions for preparing a document 73, one of the comments 75' and 76' is hidden. Therefore, the comment parts are placed in positions not overlapping them and lines connecting the positions and the original positions of the comment parts are displayed, whereby comments 75" and 76" which do not overlap can be displayed at easy-to-see placement as in a document 74.

Next, a specific example of the relayout process will be discussed in detail.

FIGS. 8(a)–8(e) are illustrations for explaining an example of document copies A and B to which the relayout process is applied and data in their comment parts. As shown in FIGS. 8(a) and 8(b), three comment parts are added to each of the document copies A and B. The positions of the comment parts are represented by a coordinate system with the upper left corner of the document as the origin in cm units, as shown in FIG. 8(c). The size of each comment is represented by height and width in cm units.

Data in the comment parts is taken out from the document copy A and a comment table (Table 1) shown in FIG. 8(d) is prepared. Likewise, a comment data table (Table 2) of the document copy B shown in FIG. 8(e) is prepared.

Figure 10:
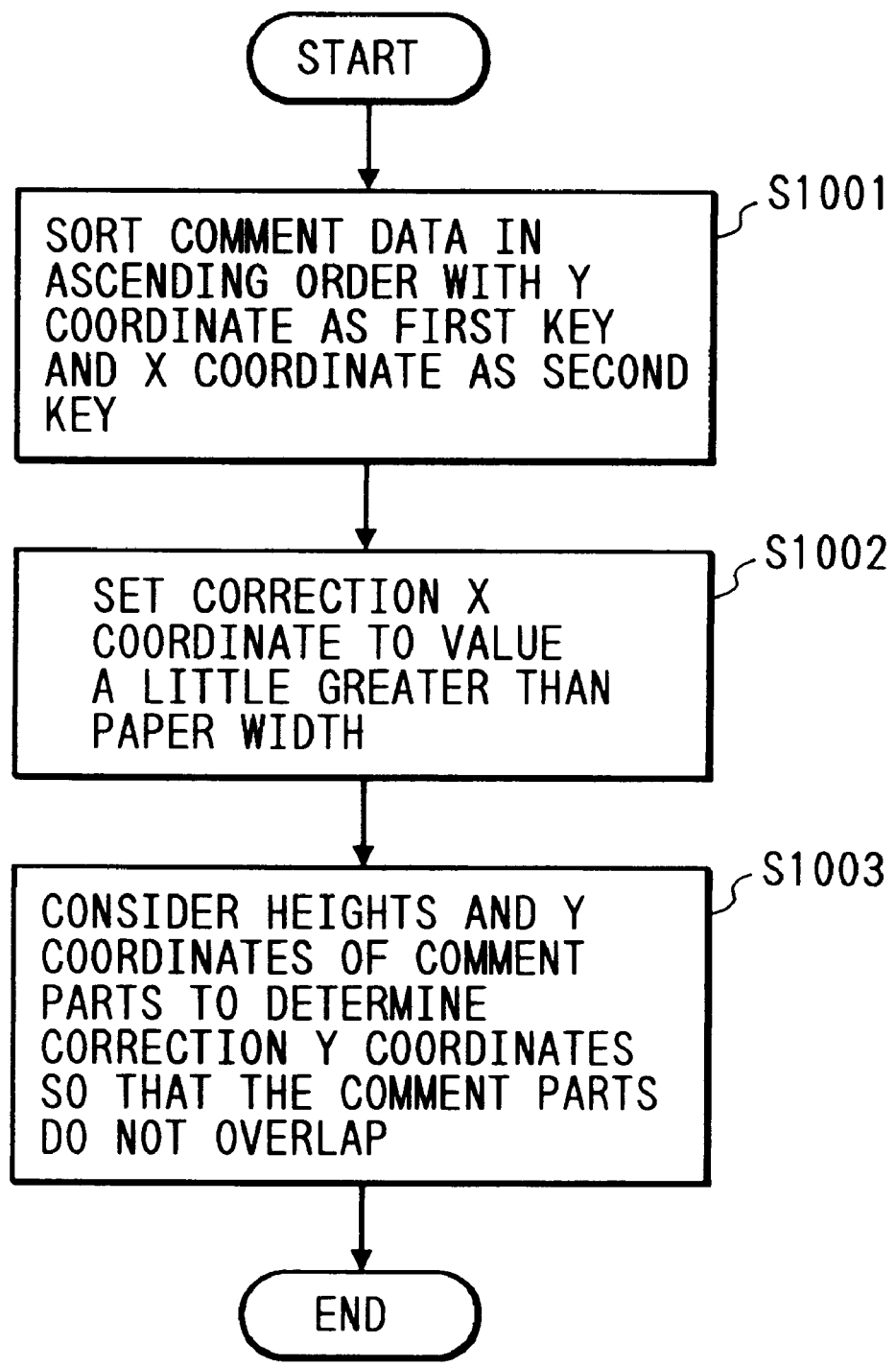
FIG. 10 is a flowchart outlining the relayout process.

Next, as shown in FIG. 9, the comment data (Table 1) of the document copy A shown in FIG. 8(d) and the comment data (Table 2) of the document copy B shown in FIG. 8(e) are combined into composite comment data (Table 3) shown in FIG. 9. FIG. 10 shows the subsequent relayout process, namely, a coordinate correction process.

That is, the composite comment data (Table 3) is resorted with the X and Y coordinates as keys into the state in Table 4 of FIG. 9 at step S1001.

Next, as shown in FIG. 11, correction coordinate positions are found based on the X and Y coordinate positions of the comment parts in Table 4 of FIG. 9. First, the X coordinate position of each comment part is set to a value greater than the paper width at step S1002 (in the example, 22 cm).

Next, the Y coordinates of the comment parts are corrected so that the comment parts do not overlap at step S1003. That is, the heights and Y coordinates of the comment parts are considered to determine correction Y coordinates so that the comment parts do not overlap. In the example, the correction Y coordinates are determined so that the correction amounts are minimized.

Figure 13:
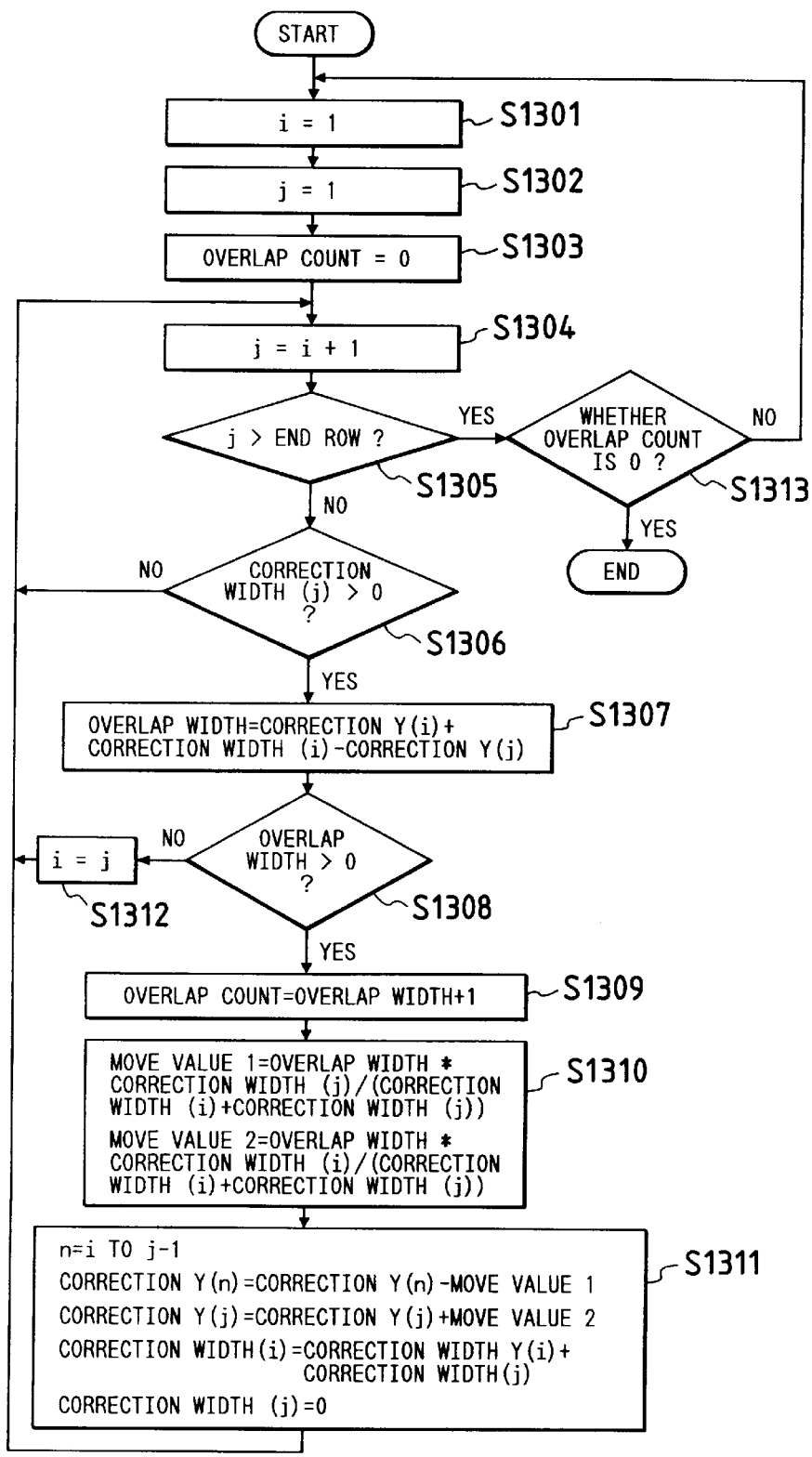
FIG. 13 is a flowchart of Y coordinate correction process.

A Y coordinate correction flow (details of step S1003) will be discussed with reference to FIGS. 12(a)–12(f) and 13; FIGS. 12(a)–12(f) show specific data and FIG. 13 is a flowchart of the Y coordinate correction process.

An example in which four comment parts are in positions shown in FIG. 12(b) is used. First, layout table 1 shown in FIG. 12(a) is prepared.

The table has columns of a row number 1201, a comment part Y coordinate 1202, a comment part width 1203, correction Y after correction 1204, and a correction width 1205 as a work area. The comment parts are in a one-to-one correspondence with the table rows. The rows are sorted in the ascending order of correction Y.

The correction Y of each row is substituted by the Y coordinate of the row and the correction width of each row is substituted by the width of the row.

Preparation of the layout data table 1 shown in FIG. 12(a) is now complete.

In the process flow in FIG. 13, first, variables i and j are set to 1 at steps S1301 and S1302 and overlap count is set to 0 at step S1303. The variables i and j indicate the row numbers of the comment parts to be checked for overlap and the overlap count is a variable to check whether or not overlap remains.

The variable j is incremented by one at step S1304 and whether or not the row number pointed to by the variable j is greater than the row number of the end row is determined at step S1305. If it is not greater than the row number of the end row, whether or not the correction width (j), the correction width of the row number j, is positive is checked at step S1306. If the correction width (j) is not positive, it indicates that the comment parts of the row numbers i and j do not overlap. Then, control goes to step S1304 for checking for the next row number. If the correction width (j) is positive, the overlap width is found at step S1307 from the following expression:

Overlap width=correction Y (i)+correction width (i)−correction Y (j)

Whether or not the overlap width is positive is checked at step S1308, and if the overlap width is not positive, it means that the current comment parts being checked for overlap do not overlap and need not be corrected. Then, i=j is set at step S1312 and control goes to step S1304. If the overlap width is positive, the overlap count is incremented by one at step S1309 and the overlap width is assigned in inverse proportion to the width ratio. That is, move values 1 and 2 inversely proportional to the width ratio are found at step S1310 and the object comment parts are moved by move values in the direction away from each other at step S1311.

The move values 1 and 2 are found according to the following expressions:

Move value (1)=overlap width*correction width (j)/(correction width (i)+correction width (j))

Move value (2)=overlap width*correction width (i)/(correction width (i) +correction width (j))

Correction Y, the Y coordinate after correction, is the coordinate of the point moved by move values (1) and (2) for row numbers n (n=i to j−1).

Correction Y(n)=correction Y(n)−move value 1
Correction Y(j)=correction Y(j)+move value 2
The correction width is determined as follows:

Correction width (i)=correction width (i)+correction width (j)

Correction width (j)=0

If it is determined at step S1305 that j>end row, whether or not the overlap count is 0 is determined at step S1313. If it is not 0, control returns to step S1301 at which the process is continued; if it is 0, the process is terminated.

Next, the Y coordinate correction flow described above will be discussed using a specific data example shown in FIG. 12.

The comment parts of row numbers #1 and #2 checked for overlap.

Overlap width=correction Y(1)+correction width (1)−correction Y(2)=4

Whether or not the overlap width is positive is determined. If it is positive, it indicates that the comment parts overlap.

The overlap width is assigned in inverse proportion to the width ratio.

Move value (1)=overlap width*correction width (2)/(correction width (1)+correction width (2))=4*4/8=2

Move value (2)=overlap width*correction width (1)/(correction width (1)+correction width (2))=4*4/8=2

Therefore,

Correction Y(1)=10−2=8

Correction Y(2)=10+2=12

The comment parts of row numbers #1 and #2 touch and will be handled as one comment part. Thus, providing that Correction width (1)=correction width (1)+correction width (2)=8, correction width (2)=0

The layout table now changes to layout table 2 shown in FIG. 12(c).

Next, the comment parts of row numbers #1 and #3 are checked for overlap.

Overlap width=correction Y(1)+correction width (1)−correction Y(3)=1

If the overlap width is positive, it indicates that the comment parts overlap.

The overlap width is assigned in inverse proportion to the width ratio.

Move value (1)=overlap width*correction width (3)/(correction width (1)+correction width (3))=1*4/(8+4)=0.333

Move value (3)=overlap width*correction width (1)/(correction width (1)+correction width (3))=1*8/(8+4)=0.666

Therefore,

Correction Y(1)=8−0.333=7.666

Correction Y(2)=12−0.333=11.666

Correction Y(3)=15+0.666=15.666

The comment parts of row numbers #1 and #3 touch and will be handled as one comment part. Thus, providing that Correction width (1)=correction width (1)+correction width (3)=12, correction width (3)=0

The layout table now changes to layout table 3 shown in FIG. 12(d).

Next, the comment parts of row numbers #1 and #4 are checked for overlap in the data in the layout table 3.

Overlap width=correction Y(1)+correction width (1)−correction Y(4)=7.666+12−17=2.666

If the overlap width is positive, it indicates that the comment parts overlap.

The overlap width is assigned in inverse proportion to the width ratio.

Move value (1)=overlap width*correction width (4)/(correction width (1)+correction width (4))=2.666*4/(12+4) 0.666

Move value (4)=overlap width*correction width (1)/ (correction width (1)+correction width (4))=2.666*12/(12+4)=2

Therefore,

Correction Y (1)=7.666−0.666=7

Correction Y (2)=11.666−0.666=11

Correction Y (3)=15.666−0.666=15

Correction Y (4)=17+2=19

The comment parts of row numbers #1 and #4 touch and will be handled as one comment part. Thus, providing that Correction width (1)=correction width (1)+correction width (4)=16, correction width (4)=0

The layout table now changes to layout table 4 shown in FIG. 12(e).

The layout process is thus completed. The comment parts are laid out according to the resultant layout data in the layout table 4, as shown in FIG. 12(f).

In the embodiment, copies of a document having the same text part among documents stored in the document storage section 12 are read out from the document storage section 12 and the text and comment separation section 15 separates text and comment parts from each other, then the relayout section 16 automatically again lays out the comment parts thus separated for the same text part for display. Thus, the comment parts can be seen collectively without imposing a burden on the worker. The embodiment defines relayout processing procedures so as to satisfy layout criteria such that comment parts do not overlap, that comment and text parts do not overlap, and that the move distance in the Y axis direction for relayout is minimized; it is excellent in easy viewing the text and comment parts at a glance on the display.

We have discussed the example in which object documents each having a text part printed on paper to which tags on which comments are written are added are input as image data, but the invention is not limited to it. For example, the invention can also be applied to electronic files to which comments are added by an electronic tag function of a processor.

According to the invention, copies of a document having the same text part among documents stored in the document storage means are read out from the document storage means and the separation means separates text and comment parts from each other, then the layout means automatically again lays out the comment parts thus separated for the same text part for display. Thus, the comment parts of document copies having the same text part can be collectively displayed at a time for the same text part without imposing a burden on the worker, whereby various comments written by the persons concerned for the same text part can be totally understood while the comments are compared with each other at a glance.

Layout criteria such that comment parts do not overlap, that comment and text parts do not overlap, that the position of each comment part is placed as near as possible to the original position, and that placement is changed depending on the type of comment part are provided as required in relayout, thereby improving easy viewing on the text-and-comment-part at a glance display.

What is claimed is:

1. A document processing unit for displaying a comment written at an arbitrary position in a document together with the document, comprising:

document storing means for storing a plurality of document files, each document file having a same document and at least one comment independently written at any position in the document;

layout means for combining and laying out the comments in positions where the respective comments correspond to said plurality of document files;

display means for displaying the document and the laid out comments;

wherein said layout means changes the positions of the comments so that the comments do not overlap with each other; and wherein said layout means obtains a first distance d1 and a second distance d2 by dividing a distance D of an overlapped portion of a first comment and a second comment in a predetermined direction in accordance with the largeness of the first comment and the largeness of the second comment, and moves the positions of the first comment and the second comment by the first distance d1 and the second distance d2.

2. A document processing unit for displaying a comment written at an arbitrary position in a document together with the document, comprising:

document storing means for storing a plurality of document files, each document file having a same document and at least one comment independently written at any position in the document;

layout means for combining and laying out the comments in positions where the respective comments correspond to said plurality of document files;

display means for displaying the document and the laid out comments;

wherein said layout means changes the positions of the comments so that the comments do not overlap with each other; and wherein said layout means prepares a table in which the comments in the plural kinds of comment information are arranged in the order of positions written into the document, sequentially takes out two adjacent comments in the table to check where the two comments overlap with each other, and moves the position of at least one of the comments if there is an overlap.

3. A document processing unit as claimed in claim 2, wherein said layout means obtains a first distance d1 and a second distance d2 by dividing a distance D of an overlapped portion of a first comment and a second comment in a predetermined direction in accordance with the largeness of the first comment and the largeness of the second comment, and moves the positions of the first comment and the second comment by the first distance d1 and the second distance d2.

4. A document processing unit as claimed in claim 3, wherein said layout means checks whether a comment group including a plurality of comments adjacent to each other overlaps with other comment group, and the plurality of comments included in the one comment group are moved if there is an overlap.

* * * * *